United States Patent
Barani et al.

(10) Patent No.: US 6,481,807 B1
(45) Date of Patent: Nov. 19, 2002

(54) ROLLER FOR TRACKS

(75) Inventors: Stefano Barani, Spilamberto (IT); Paolo Biolchini, Fanano (IT)

(73) Assignee: Italtractor ITM S.p.A., Castelvetro (IT)

( * ) Notice: Subject to any disclaimer, the term of this patent is extended or adjusted under 35 U.S.C. 154(b) by 0 days.

(21) Appl. No.: 09/671,810

(22) Filed: Sep. 22, 2000

(30) Foreign Application Priority Data

Sep. 28, 1999 (IT) ......................................... BO99A0522

(51) Int. Cl.[7] ............................................... B62D 55/15
(52) U.S. Cl. ...................................................... 305/100
(58) Field of Search ................................. 305/100, 136, 305/137, 124

(56) References Cited

U.S. PATENT DOCUMENTS

| | | | |
|---|---|---|---|
| 2,990,220 A | * 5/1961 | Malone | ........................ 305/136 |
| 3,910,128 A | 10/1975 | Boggs et al. | |
| 3,917,362 A | 11/1975 | Stedman | |
| 4,371,362 A | * 2/1983 | Dorris | ......................... 474/198 |
| 4,695,102 A | * 9/1987 | Crotti | ............................ 305/11 |
| 5,553,931 A | * 9/1996 | Diekevers | .................... 305/100 |
| 5,803,558 A | * 9/1998 | Ketting et al. | ............... 305/136 |
| 6,186,511 B1 | * 2/2001 | Anderson et al. | ........... 277/380 |

* cited by examiner

*Primary Examiner*—S. Joseph Morano
*Assistant Examiner*—Frantz F. Jules
(74) *Attorney, Agent, or Firm*—Guido Modiano; Albert Josif; Daniel O'Byrne

(57) ABSTRACT

A sliding roller for tracks of tracked vehicles, comprising a supporting shaft which is composed of two coaxial portions and a central collar, supporting bushings which are arranged on the coaxial portions on either side of the collar, a cylindrical shell which forms sliding surfaces for links of tracks; the shell encloses a cavity for accommodating the bushings and the shaft; the cavity is closed at opposite ends thereof by sealing devices which are arranged between the bushings and closure covers which are arranged at the opposite ends of the shaft; the collar and at least one of the bushings are locked in the cavity between an inner shoulder of the cavity and elements for axial retention of the bush which are rigidly coupled to the cylindrical shell.

6 Claims, 3 Drawing Sheets

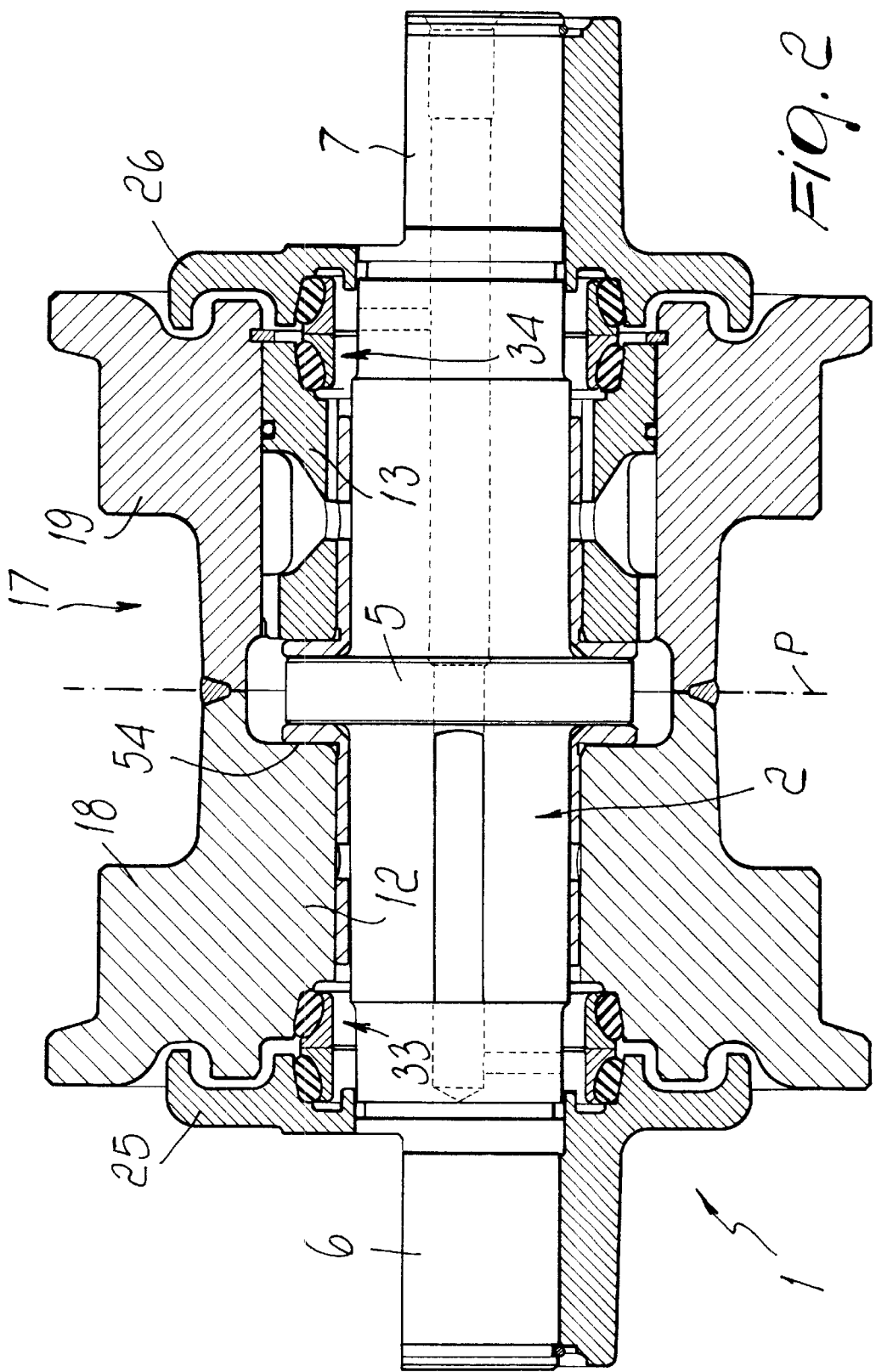

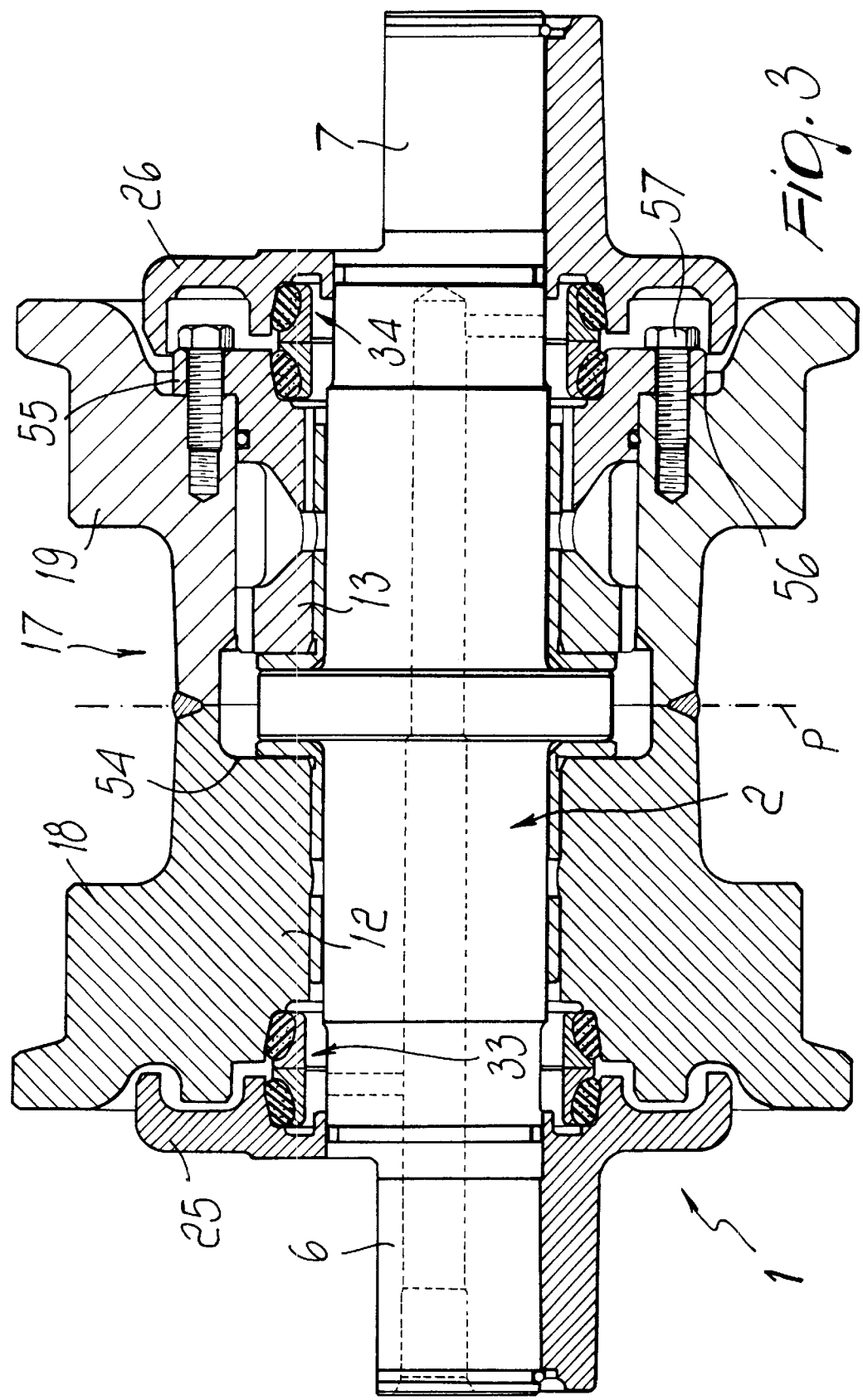

ROLLER FOR TRACKS

BACKGROUND OF THE INVENTION

The present invention relates to an improved roller for tracks.

It is known that in tracked vehicles the tracks are constituted by articulated links which wind around driving sprocket wheels and smooth driven tensioning wheels and rest on a plurality of free rollers which in practice bear the weight of the vehicle.

The rollers are turned by friction with the links of the tracks, and therefore they are subject to wear, which is worsened by the particular harsh operating conditions, such as soil which, by penetrating between the sliding surfaces of the rollers and of the tracks, has a high abrasive power.

This wear accordingly makes it necessary to replace the sliding surfaces of the rollers.

In order to allow easier and faster replacement of the sliding surfaces (hereinafter termed "shell" for the sake of convenience in description), conventional rollers have a structure which allows disassembly.

However, such structure is very complex, since it is composed of a considerable number of parts whose assembly and disassembly require time and the use of special tools.

SUMMARY OF THE INVENTION

The aim of the present invention is to obviate the drawbacks of conventional rollers, by providing a roller which is constructively simpler and requires simpler and faster operations for assembly and disassembly.

This aim is achieved with a sliding roller for the tracks of tracked vehicles, which comprises a supporting shaft which is composed of two coaxial portions and a central collar, supporting bushings which are arranged on said coaxial portions on either side of said collar, a cylindrical shell which forms sliding surfaces for the links of tracks, said shell enclosing a cavity for accommodating said bushings and said shaft, said cavity being closed at opposite ends thereof by sealing devices which are arranged between said bushings and closure covers which are arranged at the opposite ends of said shaft, characterized in that said collar and at least one of said bushings are locked in said cavity between an inner shoulder of said cavity and means for the axial retention of said bush which are rigidly coupled to said cylindrical shell.

BRIEF DESCRIPTION OF THE DRAWINGS

Further characteristics and advantages of the present invention will become better apparent from the following detailed description thereof on the basis of the accompanying drawings, wherein, by way of non-limitative example:

FIG. 2 is a longitudinal sectional view of a roller according to a second embodiment; and FIG. 3 is a longitudinal sectional view of a roller according to a third embodiment.

DESCRIPTION OF THE PREFERRED EMBODIMENTS

Figure 1:
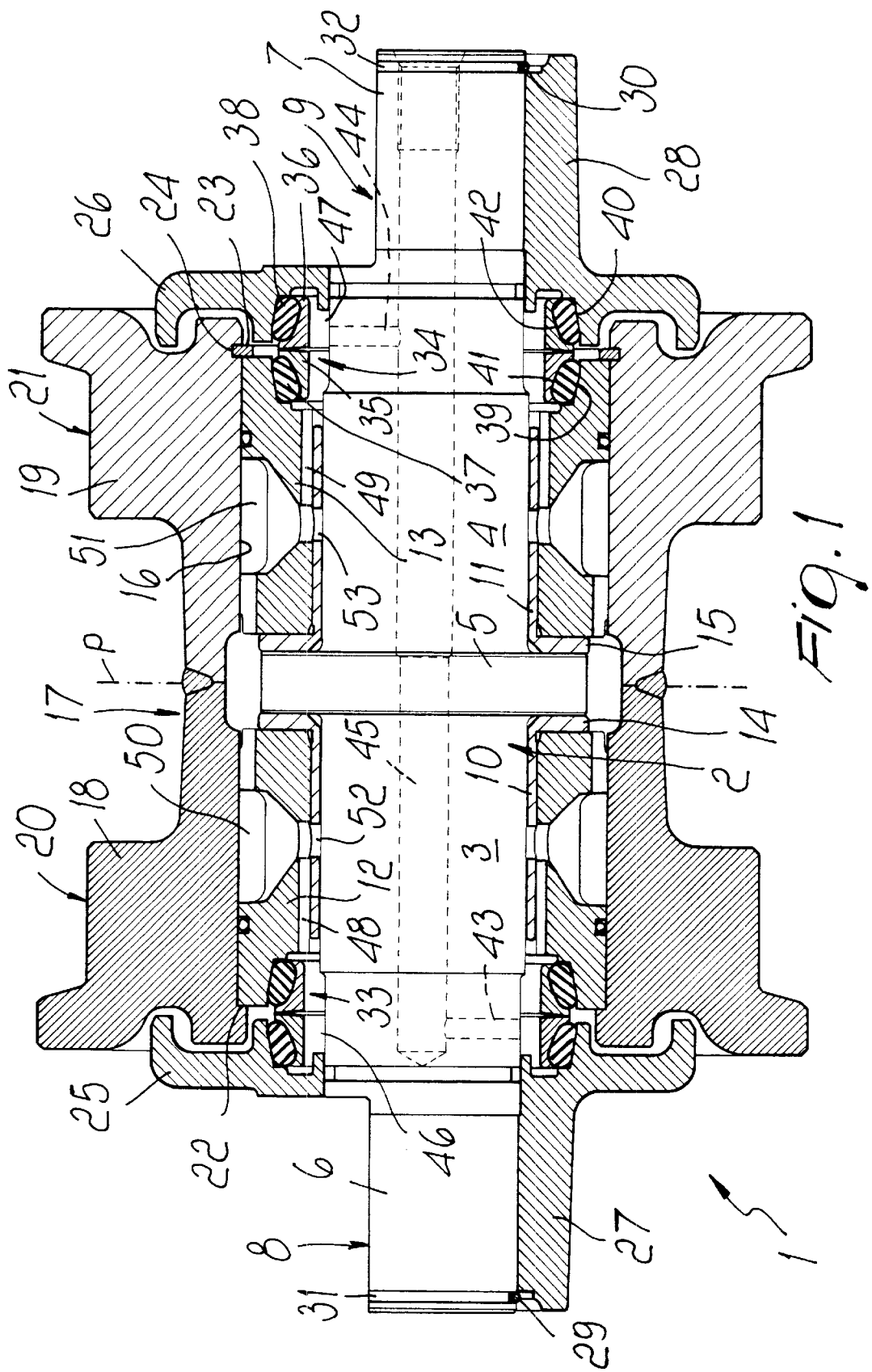
FIG. 1 is a longitudinal sectional view of a roller according to a first embodiment of the invention.

With reference to FIG. 1, the reference numeral 1 generally designates a roller, which is composed of a shaft 2 in which there are two coaxial portions 3 and 4 mutually separated by a central collar 5. The portions 3 and 4 end with respective shanks 6 and 7 which have flat regions 8 and 9 for resting on respective supports of the vehicle on which the roller is fitted.

Respective tubular elements or bushings 12 and 13 are arranged on the portions 3 and 4, with interposed antifriction bushings, hereinafter termed bearings 10 and 11 for the sake of brevity, and have an outside diameter which is greater than the outside diameter of the collar 5. The bearings 10 and 11 are provided with flanges 14 and 15 which are interposed between the collar 5 and the adjacent ends of the bushings 12 and 13.

The bushings 12 and 13 are inserted (preferably with an interference fit) in a cylindrical cavity 16 of a cylindrical shell 17 composed of two half-shells 18 and 19 which are mutually mirror-symmetrical with respect to a centerline plane P of the roller 1. The half-shells 18 and 19 are mutually welded so as to form two channels 20 and 21 for the sliding of the links of the tracks.

The bushings 12 and 13 are retained in the cavity 16 by providing a shoulder 22 which is constituted by an annular raised portion formed inside the half-shell 18 and an elastic ring 23 which is accommodated in an annular slot 24 formed inside the half-shell 19. The locking of the bushings 12 and 13 between the shoulder 22 and the ring 23 further locks the collar 5 interposed between them and positions the shaft 2 axially.

The shaft 2 is fixed to the supports of the vehicle by means of covers 25 and 26 which close, at opposite ends, the cavity 16 and have bushing halves 27 and 28 which are fitted on the ends 7 and 8 of the shaft and are provided with two diametrical wings (not shown in the drawing) through which screws are driven in order to fix them to the supports. The covers are retained on the ends 6 and 7 by rings 29 and 30 which are recessed in grooves 31 and 32 of such ends and act as a shoulder for the bushing halves 27 and 28.

Respective sealing devices 33 and 34, which are per se known, are arranged between the covers 25 and 26 and the adjacent ends of the bushings 12 and 13.

Each device is composed of two sealing rings 35 and 36 which are pressed into front sliding contact with each other by way of two thrust rings 37 and 38. The thrust rings 37 and 38 are constituted by two toroidal rubber elements which are compressed between inclined and converging surfaces 39, 40 and 41, 42 of the bushings 12 and 13 and of the covers 25 and 26 of the sealing rings 35 and 36, respectively, so as to provide an axial force component which keeps the rings 35 and 36 in front sliding contact.

The described roller is completed by radial holes 43 and 44 which are connected to a duct 45, which passes axially through the shaft 2, and to the compartments 46 and 47 which lie inside the rings 35 and 36 of the sealing devices 33 and 34. Axial passages 48 and 49 extend from the compartments 46 and 47 and lead, through ducts 50 and 51 and slots 52 and 53, to the regions where the bearings 10 and 11 slide on the shaft 2 and on the collar 5.

Lubricant is conveyed into the regions of contact between the sealing rings 35 and 36 through the duct 45 and the radial holes 43 and 44. The lubricant, after entering the passages 48 and 49 and the ducts 50 and 51, also keeps the bearings 10 and 11 lubricated.

It is evident that the described invention perfectly achieves the intended aim. In particular, the shoulder 22 of the half-shell 18 allows to avoid the arrangement of an abutment ring, with the consequent difficulties in manufacture and assembly.

The described roller is susceptible of numerous modifications and variations, all of which are within the scope of the same inventive concept.

The embodiment of FIG. 2 differs from the preceding one in that the bushing 12 is formed monolithically with the half-shell 18 and forms an annular shoulder 54 which is equivalent to the shoulder 22 and against which the collar 5 of the shaft 2 rests directly with the flange 14 of the bearing 10 interposed.

The embodiment of FIG. 3 differs from the embodiment of FIG. 2 in that the axial retention of the bushing 13, instead of being provided by means of an elastic ring, is achieved by providing, at the end of the bushing 13 that lies opposite the end for abutment on the collar 5, a flange 55 which is fixed against the front surface 56 of the half-shell 19 by means of screws 57.

The disclosures in Italian Patent Application No. B099A000522 from which this application claims priority are incorporated herein by reference.

What is claimed is:

1. A sliding roller for tracks of tracked vehicles, comprising a supporting shaft which is composed of two coaxial portions and a central collar, supporting bushings which are arranged on said coaxial portions on either side of said collar, a cylindrical shell which forms sliding surfaces for said tracks, said shell enclosing a cavity for accommodating said bushings and said shaft, said cavity having opposite ends closed by closure covers and sealing devices, said sealing devices being arranged between said bushings and said closure covers, wherein said cavity is provided at one end with an inner shoulder and said collar and at least one of said bushings are locked in said cavity between said inner annular shoulder of said cavity and means for axial retention of said bushing which are rigidly coupled to said cylindrical shell, and wherein a first one of said bushings is formed monolithically with said shell and forms said inner annular shoulder for the abutment of said central collar of said shaft, said collar and a second one of said bushings being retained inside said cavity between said annular shoulder and an elastic ring which is arranged at the end of said cavity that lies opposite said shoulder.

2. The roller according to claim 1, wherein said inner annular shoulder is constituted by an annular protrusion which is formed at one end of said cavity, said collar and said bushings being retained inside said cavity between said annular raised portion and an elastic ring which is arranged at the end of said cavity that lies opposite said protrusion.

3. The roller according to claim 1, wherein a first one of said bushings is formed monolithically with said shell and forms said inner annular shoulder for the abutment of said central collar of said shaft, said collar and a second one of said bushings being retained inside said cavity between said inner annular shoulder and a flange formed at the end of said second bushing that lies opposite said collar and is fixed by means of screws against a front surface of said shell.

4. A sliding roller for tracks of tracked vehicles, comprising a supporting shaft which is composed of two coaxial portions and a central collar, supporting bushings which are arranged on said coaxial portions on either side of said collar, a cylindrical shell which forms sliding surfaces for said tracks, said shell enclosing a cavity for accommodating said bushings and said shaft, said cavity having opposite ends closed by closure covers and sealing devices, said sealing devices being arranged between said bushings and said closure covers, wherein said cavity is provided at one end with an inner shoulder and said collar and at least one of said bushings are locked in said cavity between said inner annular shoulder of said cavity and means for axial retention of said bushing which are rigidly coupled to said cylindrical shell, and wherein a first one of said bushings is formed monolithically with said shell and forms said inner annular shoulder for the abutment of said central collar of said shaft, said collar and a second one of said bushings being retained inside said cavity between said inner annular shoulder and a flange formed at the end of said second bushing that lies opposite said collar and is fixed by means of screws against a front surface of said shell.

5. The roller according to claim 4, wherein said inner annular shoulder is constituted by an annular protrusion which is formed at one end of said cavity, said collar and said bushings being retained inside said cavity between said annular raised portion and an elastic ring which is arranged at the end of said cavity that lies opposite said protrusion.

6. The roller according to claim 4, wherein a first one of said bushings is formed monolithically with said shell and forms said inner annular shoulder for the abutment of said central collar of said shaft, said collar and a second one of said bushings being retained inside said cavity between said annular shoulder and an elastic ring which is arranged at the end of said cavity that lies opposite said shoulder.

\* \* \* \* \*